United States Patent [19]

Fujimoto

[11] Patent Number: 4,736,501
[45] Date of Patent: Apr. 12, 1988

[54] ELECTRIC STRIPPER
[75] Inventor: Kaoru Fujimoto, Osaka, Japan
[73] Assignee: Nihon Nejimawashi Co., Ltd., Osaka, Japan
[21] Appl. No.: 903
[22] Filed: Jan. 6, 1987
[30] Foreign Application Priority Data
 Mar. 17, 1986 [JP] Japan .............................. 61-39286[U]
[51] Int. Cl.⁴ ............................................. H02G 1/12
[52] U.S. Cl. .................... 29/33 F; 30/91.2; 81/9.44; 81/9.51
[58] Field of Search .................. 29/33 D, 33 F, 564.4; 81/9.4, 9.44, 9.51; 30/90.1, 91.2

[56] References Cited
U.S. PATENT DOCUMENTS

| 2,422,776 | 6/1947 | Cunny et al. | 81/9.51 |
| 3,387,514 | 6/1968 | Carpenter | 81/9.51 |
| 3,537,339 | 11/1970 | Carpenter | 81/9.51 |
| 3,630,105 | 12/1971 | Rider | 81/9.51 |
| 3,838,612 | 10/1974 | Inami | 81/9.51 |

FOREIGN PATENT DOCUMENTS

| 53-11817 | 3/1978 | Japan . |
| 54-31351 | 10/1979 | Japan . |
| 56-133722 | 3/1981 | Japan . |

Primary Examiner—Gil Weidenfeld
Assistant Examiner—Daniel W. Howell
Attorney, Agent, or Firm—Armstrong, Nikaido, Marmelstein & Kubovcik

[57] ABSTRACT

An electric stripper comprising a pivotal arm carrying a cutter blade and pivoted to a rotary housing. The cutter blade is movable toward or away from the axis of rotation of the housing by the pivotal movement of the arm. The arm is pivotally movable by being biased by springs. When an interchangeable wheel is mounted on the housing, a pivotally moving portion of the arm slidingly moves relative to a biting amount adjusting portion of the wheel in engagement therewith to thereby pivotally move the arm against the biasing springs.

8 Claims, 6 Drawing Sheets

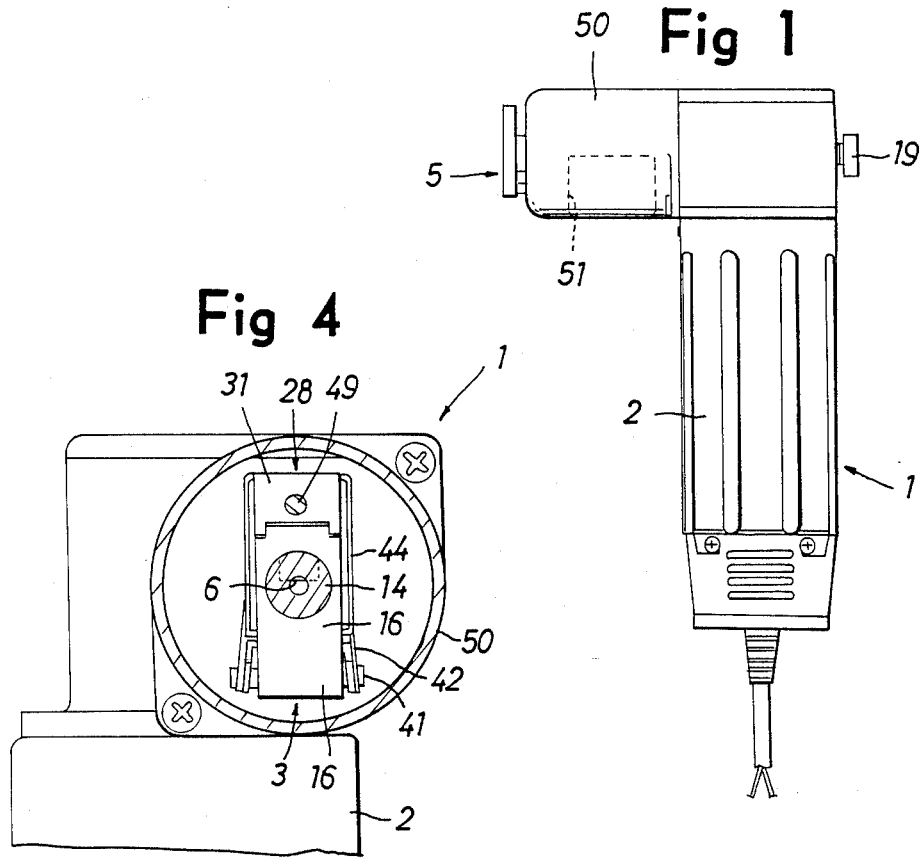
Fig 1
Fig 4
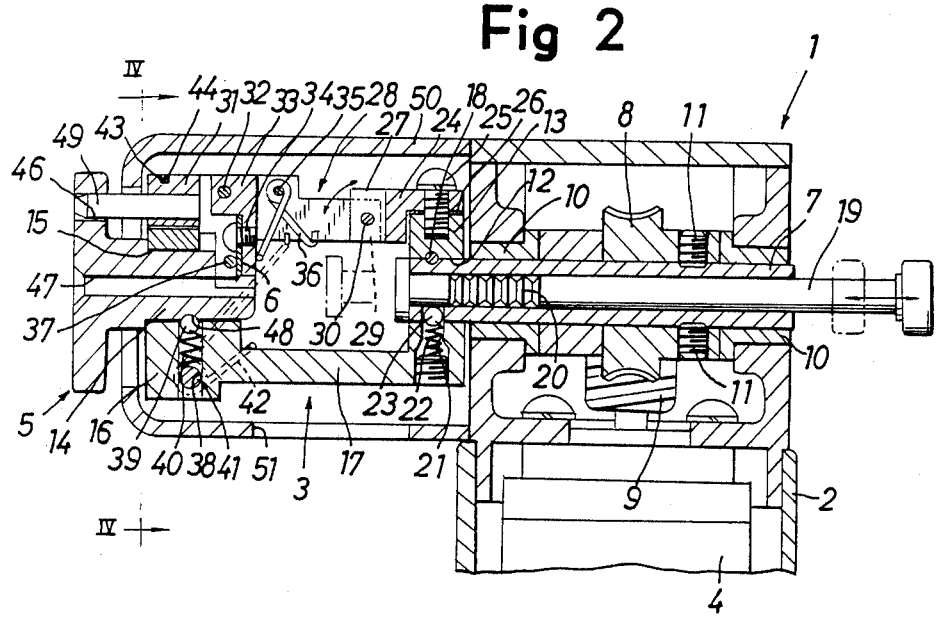
Fig 2

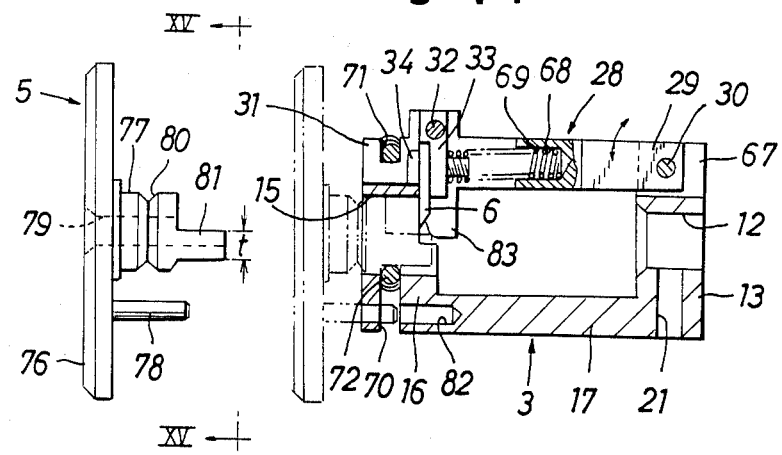
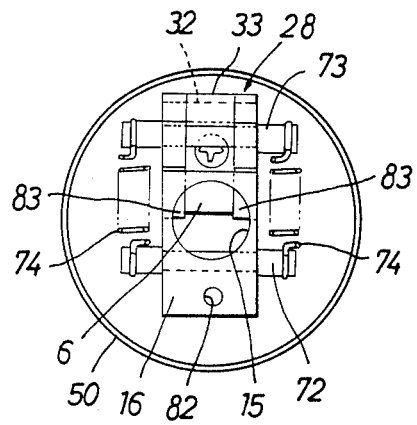
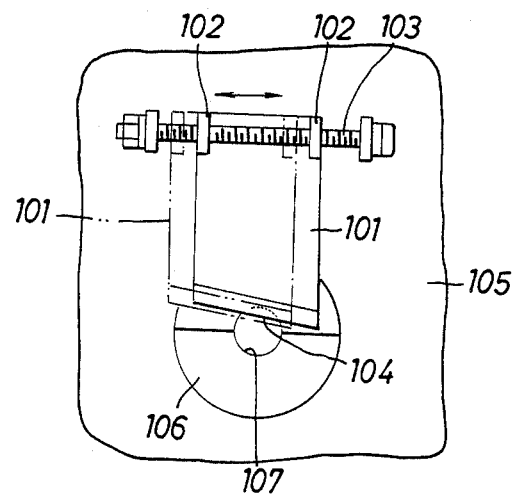
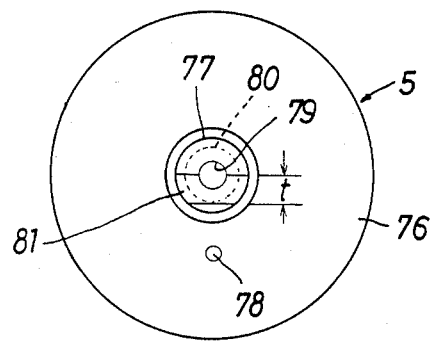

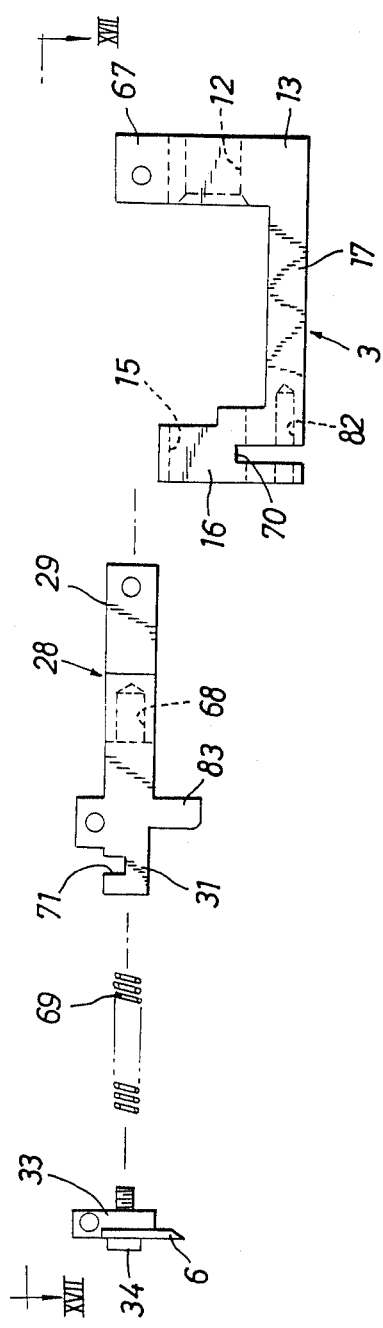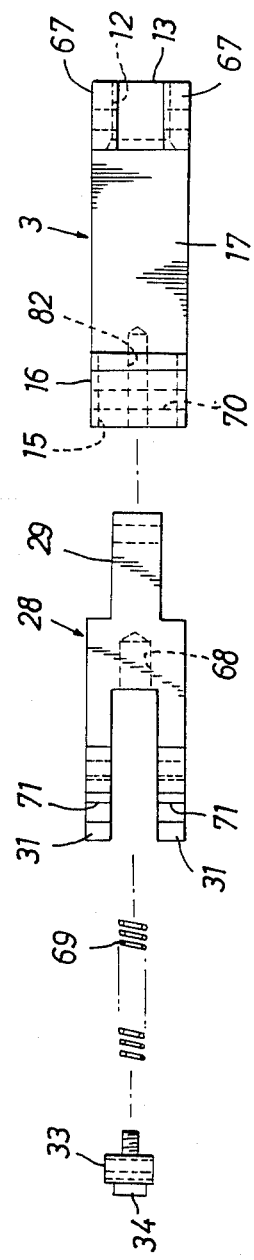

ELECTRIC STRIPPER

FIELD OF THE INVENTION AND RELATED ART STATEMENT

The present invention relates to an electric stripper for cutting off and removing an insulation covering portion from electric wires or cables and also twisting the conductor portion.

Conventional electric strippers of the type mentioned include those comprising a rotary housing rotatable by an electric motor and enclosed in a case, an interchangeable wheel removably attached to one side of the rotary housing, and a cutter mounted on the rotary housing for cutting off an insulating covering portion from an electric wire inserted through an insertion bore formed in the wheel. The stripper is adapted to cut off and remove a suitable length of insulating covering from a specified electric wire and to suitably twist the stripped conductor portion when the wire is inserted through the bore of the wheel and thereafter withdrawn while the rotary housing is in rotation. When the stripper is to be used for another electric wire of different outside diameter, the wheel is replaced by another interchangeable wheel having an insertion bore diametrically corresponding to the wire, and the amount of bite of the cutter blade is suitably adjusted in accordance with the wall thickness of the insulation covering of the wire. Thus, the stripper is usable for electric wires of different diameters. With reference to FIG. 18, the biting amount of the cutter blade is adjustable by a mechanism which comprises a screw rod 103 having screwed thereon the base portions 102 of the cutter 101, such that the screw rod 103, when rotated, moves the cutter 101 relative to the rod 103 axially thereof. The blade 104 of the cutter 101 is inclined with respect to the axis of the screw rod 103. The biting amount is adjustable by moving the cutter 101 axially of the rod 103 as described above. The screw rod 103 is supported by the rotary housing indicated at 105. The interchangeable wheel is indicated at 106, and the insertion bore thereof at 107.

With the above arrangement, however, the biting amount of the cutter 101 must be adjusted by rotating the screw rod 103 every time the interchangeable wheel 106 is replaced. The adjustment therefore requires a cumbersome manual procedure.

OBJECT AND SUMMARY OF THE INVENTION

In view of the foregoing problem heretofore encountered, the main object of the present invention is to make the cutter blade easily adjustable in biting amount.

To achieve the object, the present invention provides an electric stripper which is characterized by the following means.

More specifically, the present invention provides an electric stripper comprising a rotatably supported rotary housing, electric drive means for rotating the housing, an interchangeable wheel removably mountable on the housing in the direction of the axis of rotation of the housing and having an electric wire insertion bore positionable in alignment with the axis, and a cutter blade mounted on the housing and adjustable in biting amount for cutting off an insulation covering portion from an electric wire inserted through the insertion bore, the stripper being characterized in that a pivotal arm is pivoted to the rotary housing and provided with the cutter blade at the arm free end, the cutter blade being movable toward or away from the axis of rotation of the rotary housing by the pivotal movement of the pivotal arm.

The stripper includes spring means for biasing the pivotal arm so as to pivotally move the arm toward one direction.

The pivotal arm has a pivotally moving portion, while the interchangeable wheel is provided with a biting amount adjusting portion. When the interchangeable wheel is mounted on the rotary housing, the pivotally moving portion of the pivotal arm slidingly moves relative to the adjusting portion of the interchangeable wheel in engagement therewith, thereby pivotally moving the pivotal arm a predetermined amount against the biasing spring means to automatically adjust the biting amount of the cutter blade.

BRIEF DESCRIPTION OF THE DRAWINGS

FIG. 1 is an overall front view showing an embodiment of the present invention;

FIG. 2 is a fragmentary front view in section showing the same;

FIG. 4 is a view in section taken along the line IV—IV in FIG. 2;

FIG. 13 is a view in section taken along the line XII—XII in FIG. 12;

FIG. 14 is a view showing the same for illustrating how to mount an interchangeable wheel in position;

FIG. 15 is a view showing the wheel as it is seen in the direction of arrows XV—XV in FIG. 14;

FIG. 16 is an exploded view showing some of the members illustrated in FIG. 14;

FIG. 17 is a view showing the same as seen in the direction of arrows XVII—XVII in FIG. 16; and FIG. 18 is a fragmentary view for illustrating a conventional stripper.

DESCRIPTION OF THE PREFERRED EMBODIMENTS

Figure 3:
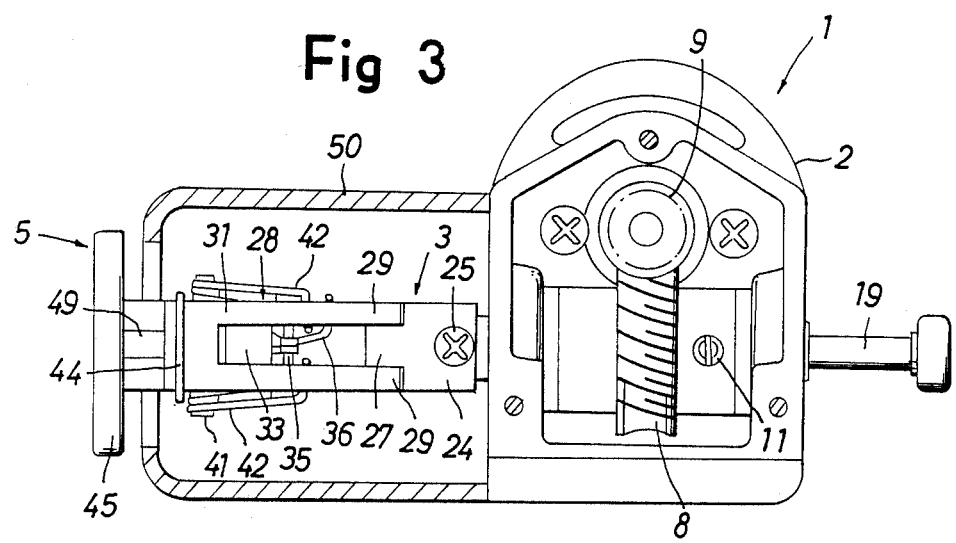
FIG. 3 is a plan view partly in section and showing the same.

Embodiments of the present invention will be described below with reference to the drawings.

FIGS. 1 to 5 show an electric stripper 1 which is generally L-shaped in its entirety and comprises a rotary housing 3 rotatably supported by a case 2, an electric motor 4 for rotating the housing, an interchangeable wheel 5 mounted on the housing 3, a cutter blade 6 for cutting off an insulation covering portion from electric cables or wires, etc.

The electric motor 4 is accmmodated within the case 2 which is tubular, and is turned on or off by an unillustrated switch. A hollow cylindrical rotary shaft 7 supported by one end of the case 2 is fixedly provided with a worm wheel 8 meshing with a worm 9 mounted on the motor 4. The motor 4, worm 9, worm wheel 8 and rotary shaft 7 constitute electric drive means for rotating the rotary housing 3.

The shaft 7 is supported by oil-containing bearings 10. The worm wheel 8 is fastened to the shaft 7 by locking screws 11.

The rotary housing 3 comprises a base portion 13 having a hole 12 for one end of the shaft 7 to fit in, a wheel mount 16 having a mount bore 15 through which a support tube 14 of the wheel 5 is removably inserted, and a portion 17 for connecting the base portion 13 to the wheel mount 16. The housing 3 is generally U-shaped. The hole 12 of the base portion 13 is in alignment with the mount bore 16 of the wheel mount 16.

One end of the rotary shaft 7 is fitted in the hole 12 of the base portion 13 and held in position against slipping off by a lockpin 18. Thus, the shaft 7 is made rotatable with the housing 3.

A cutting length adjusting rod 19 for adjusting the length of the insulation covering portion to be cut off from an electric wire extends through the rotary shaft 7 and is movable relative to the shaft axially thereof. The length adjusting rod 19 is formed in its outer periphery with a plurality of stepped portions 20 as arranged axially thereof near one end thereof, and a ball 23 biased by a coiled spring 22 is inserted in a support hole 21 formed in the wall of the shaft 7, whereby means for positioning the cuttting length adjusting rod 19 is provided.

An arm support 24 is removably fastened to one end of the base portion 13 by a screw 25. The level of the arm support 24 is adjustable by an interchangeable level adjusting washer 26.

The arm support 24 has a support wall 27 fitted between bifurcated portions 29 of a pivotal arm 28 at its base end. The pivotal arm 28 is movably supported by a pivot 30 at the base end.

Figure 5:
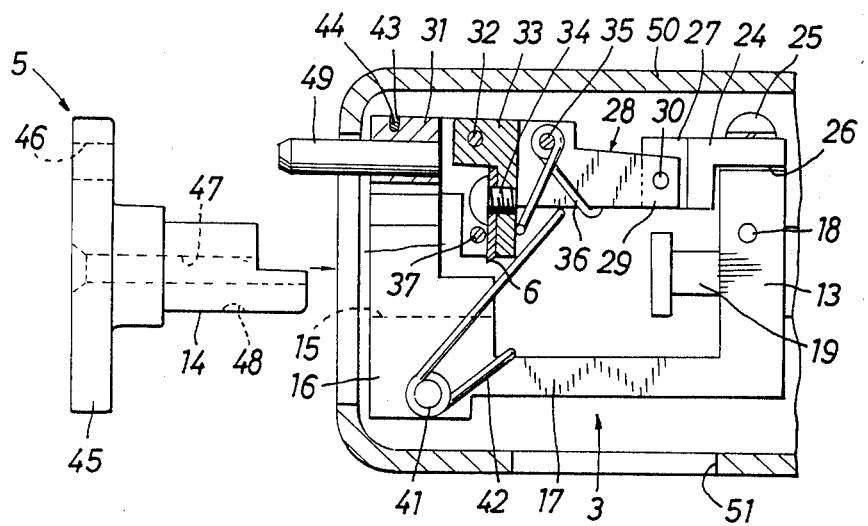
FIG. 5 is a view illustrating how to mount an interchangeable wheel in place.

The free end 31 of the pivotal arm 28 has the cutter blade 6 movably supported by a pivot 32. The cutter blade 6 is movable toward or away from the axis of rotation of the housing 3 by the pivotal movement of the arm 28. According to the present embodiment, the cutter blade 6 is removably fastened by a screw 34 to a support member 33 which is supported by the pivot 32. As shown in FIGS. 2 and 5, the cutter blade 6 is biased into contact with a stopper pin 37 by a spring 36 mounted on a pin 35 provided at an intermediate portion of the pivotal arm 22.

With reference to FIG. 2, the wheel mount 16 of the rotary housing 3 has a bore 38 communicating with the mount bore 15 and accommodating a ball 39 and a coiled spring 40, which are supported and prevented from slipping off by a spring support pin 41 across the bore 38. The ball 39 is retractably projected into the mount bore 15 by being biased by the coiled spring 40.

The spring support pin 41 has opposite projecting ends each carrying a coiled spring 42 for biasing the free end 31 of the pivotal arm 28 away from the axis of rotation of the rotary housing 3. The arm free end 31 has a cutout 43. The amount of movement of the pivotal arm 28 away from the axis is suitably restricted by a restraining rod 44 fitted in the cutout 43 and engaged with the opposite sides of the wheel mount 16 of the housing 3.

The interchangeable wheel 5 has a disklike main body 45, the above-mentioned support tube 14 extending from one side of the main body 45 centrally thereof, and an adjusting bore 46 formed in the main body 45 eccentrically thereof away from the tube 14 and serving as a biting amount adjusting portion. The wheel 5 has an insertion bore 47 having a suitable diameter and extending through the main body 45 and the tube 14. The support tube 14 is formed in the outer periphery of an intermediate portion thereof with a recess 48 in which the ball 39 is removably engaged by the action of the spring 40. One half of the inserted end of the support tube 14 is cut away.

The pivotal arm 28 has a moving rod 49 projecting from its free end 31 and serving as a pivotally moving portion. The rod 49 is fittable into the adjusting bore 46 of the interchangeable wheel 5 in sliding contact with the bored portion relative thereto. With reference to FIG. 5, the wheel 5 is mounted in place by inserting the support tube 14 into the mount bore 15 of the housing 3 while fitting the moving rod 49 into the adjusting bore 46. Consequently, the free end of the pivotal arm 28 is pivotally moved toward the axis of rotation of the housing 3 against the force of the coiled springs 42, whereby the cutter blade 6 is moved toward the axis to automatically adjust the amount of bite of the cutting blade.

The center-to-center distance between the adjusting bore 46 and the insertion bore 47 is so determined that the pivotal arm 28 is moved in accordance with the wall thickness of the insulation covering of the electric wire diametrically corresponding to the insertion bore 47.

As shown in FIG. 2, the ball 39 fits into the recess 48 in the support tube 14, whereupon the wheel 5 is completely mounted in place.

A cover 50 covering the housing 3, etc. is removably attached to the case 2. The cover 50 has an opening 51 for discharging therethrough the insulation covering portion 54 removed from the wire 53.

Figure 6:
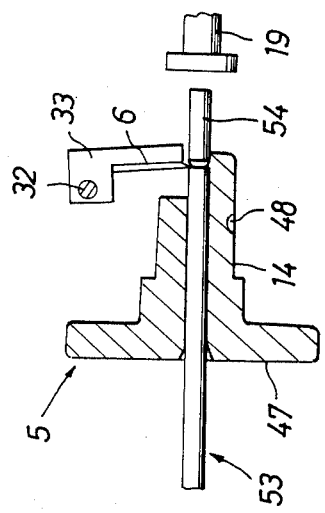
FIG. 6 is a diagram illustrating the initial stage of cutting off an insulating covering portion from an electric wire.
Figure 7:
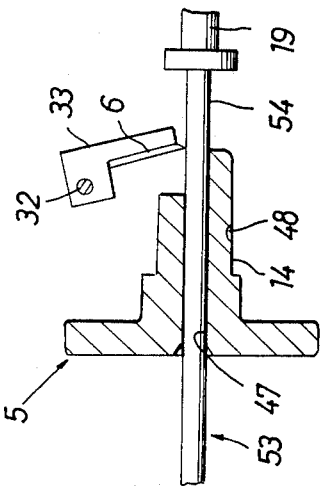
FIG. 7 is a diagram illustrating an intermediate stage of the cutting operation.
Figure 8:
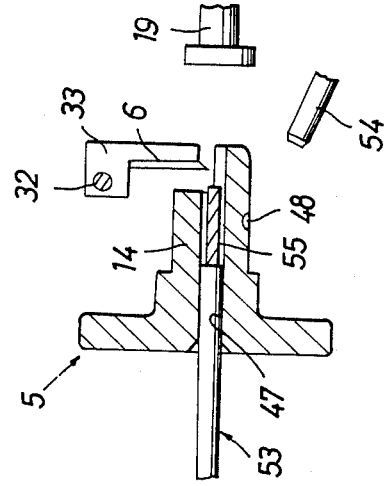
FIG. 8 is a diagram illustrating the cutting operation upon completion.

To use the electric stripper 1, the case 2 is grasped by the hand, and the motor 4 is driven after adjusting the cutting length adjusting rod 19 to a suitable position. The end of the wire 53 is then inserted through the bore 47 of the interchangeable wheel 5 into contact with the cutting length adjusting rod 19 and is thereafter withdrawn. Stated more specifically, the wire 53, when inserted, moves the cutter blade 6 about the pivot 32 against the force of the coiled spring 36 and comes into contact with the cutting length adjusting rod 19 as shown in FIG. 6. When the wire 53 is pulled out, the cutter blade 6 is returned while biting into the insulating covering 54 of the wire 53 as seen in FIG. 7 and is brought to the initial position as shown in FIG. 8. During this operation, the cutter blade 6 and the interchangeable wheel 5 are rotating with the housing 3, and the wire 53 is rotating relative to the cutter blade 6, so that the insulating covering 54 of the wire 53 is cut over the entire circumference at a predetermined portion. When the wire 53 is pulled out, the conductor portion 55 is withdrawn from the cut-off insulating covering portion 54 which is in contact with the inner side of the cutting blade 6. In this step, the wire 53 is also rotating relative to the housing 3, the cutter blade 6 and the wheel 5, with the result that relative rotation occurs between the conductor portion 55 and the cut-off insulation covering portion 54 to twist the conductor portion 55 being withdrawn from the insulation covering portion 54. In this way, the insulation covering portion 54 of desired length can be cut off and removed with the stripped conductor portion 55 twisted, merely by inserting the wire 53 through the insertion bore 47 of the wheel 5 and pulling out the wire. The wire can therefore be stripped efficiently. The engagement of the moving rod 49 in the adjusting bore 46 prevents the pivotal arm 28 from moving away from the axis of rotation of the housing, so that the insulation covering portion 54 can be cut properly. The length of the portion 54 to be cut off is adjustable by moving the cutting length adjusting rod 19 axially thereof.

When the stripper is to be used for an electric wire 53 of different diameter, the wheel 5 is replaced by another one having an insertion bore 47 diametrically corresponding to the wire 53.

In mounting the substituted wheel 5, the adjusting bored portion 46 and the moving rod 49 on the pivotal arm 28 slide along relative to each other in engagement, moving the pivotal arm 28 a specified amount to automatically adjust the biting amount of the cutter blade 6 according to the diameter of the wire 53. This eliminates the need to additionally adjust the biting amount of the cutter blade 6 upon replacement, assuring convenient use and making the stripper lightweight, compact and easy to carry by the hand for use.

To use the stripper for electric wires 53 of varying diameters, interchangeable wheels 5 are prepared which have insertion bores 47 diametrically corresponding to the different wires 53. Each wheel 5 has an adjusting bore 46 at a suitable distance from the insertion bore 47 so that the cutter blade 6 will be positioned optimally in corresponding relation to the wall thickness of the insulation covering 54 of the specified wire 53.

Figure 9:
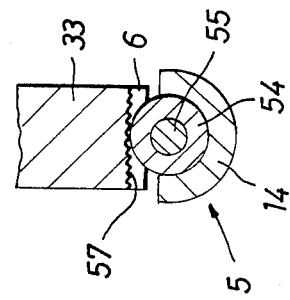
FIG. 9 is a fragmentary view in section showing another embodiment.

Further as seen in FIG. 9, the bottom end of the support member 33 carrying the cutter blade 6 may be rough-surfaced as at 57 with sharp ridges or by knurling for pressing the insulation covering portion 54 to be cut off against the inner surface of the support tube 14 in engagement with the outer periphery of the portion 54 to render the conductor portion 55 more effectively rotatable relative to the cut-off portion 54. The conductor portion 55 can then be twisted effectively even when the wire 53 has an increased diameter.

Figure 10:
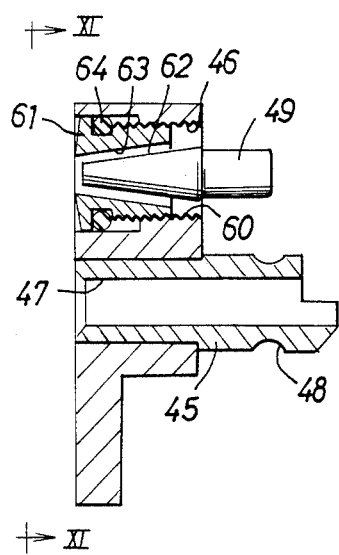
FIG. 10 is a sectional view showing the relation between an interchangeable wheel and a pivotally moving portion according to another embodiment.
Figure 11:
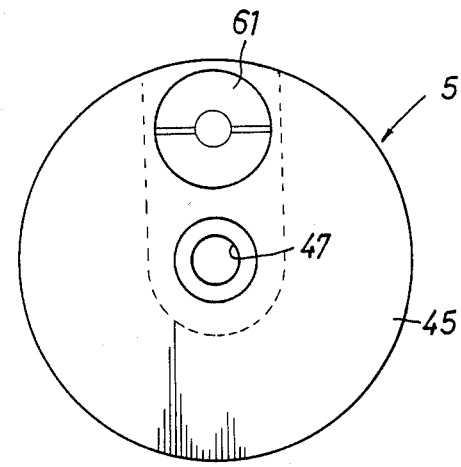
FIG. 11 is a view showing the same as the wheel and the moving portion are seen in the direction of arrows XI—XI in FIG. 10.

The interchangeable wheel 5 and the pivotally moving rod 49 may be so designed as shown in FIGS. 10 and 11. The illustrated wheel 5 comprises a main body 45 and a support tube 14 formed as separate members and fixedly joined together as by a shrink fit. The tube 14 has a circumferential annular recess 48. The projecting end of the moving rod 49 has a gradually decreasing diameter toward its extremity and is tapered. The wheel 5 has an adjusting bore 46 opposed to the tapered end and internally threaded as at 60. A fine adjustment screw 61 is movably screwed in the threaded bore 46. The screw 61 has a tapered bore 63 conforming to the shape of the tapered end 62 of the moving rod 49. Indicated at 64 is an O-ring.

Accordingly, the biting amount of the cutter blade 6 is finely adjustable by advancing or retracting the fine adjustment screw 61 to accommodate errors in the thickness of the insulation coverings of wires 53 produced by different manufacturers.

Although the adjusting bore 46 serves as the biting amount adjusting portion with the moving rod 49 serving as the pivotally moving portion, an adjusting rod may be provided as the biting amount adjusting portion, and a moving bore as the pivotally moving portion.

Further alternatively, the rotary housing 3 and the interchangeable wheel 5 may be so constructed as shown in FIGS. 12 to 17. The rotary housing 3 and the rotary shaft 7 are made rotatable together by pressing one end of the shaft 7 into the hole 12 of the base portion 13 of the housing and crimping the end to the portion 13.

Figure 12:
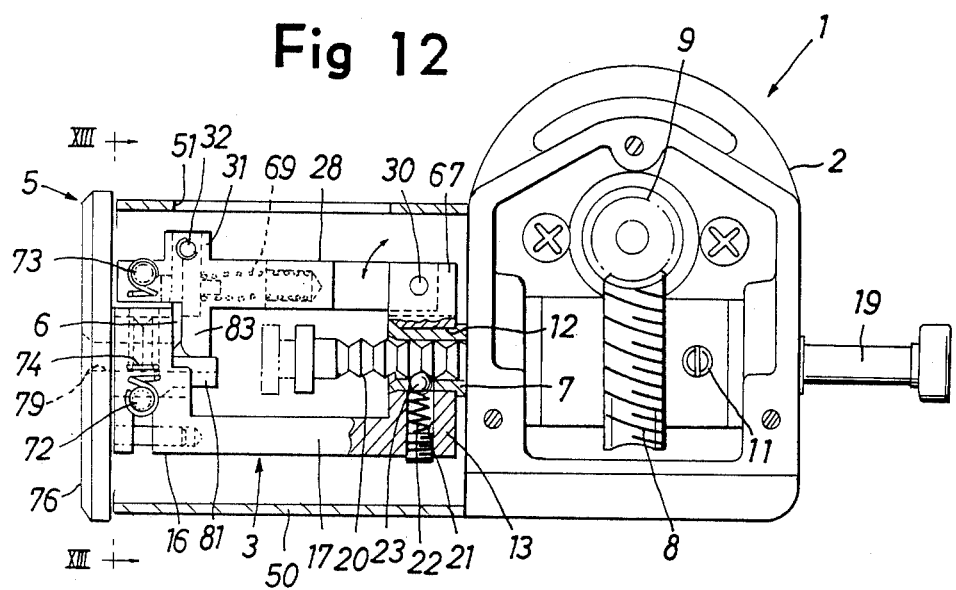
FIG. 12 is a plan view partly in section and showing another embodiment.

One end of the base portion 13 is provided with a pair of support walls 67 and 67 opposed to each other. The base end 29 of a pivotal arm 28 is inserted between the support walls 67, 67 and movably supported by a pivot 30. The free end 31 of the pivotal arm 28 is bifurcated, and a cutter blade 6 is inserted between the bifurcated end portions 31, 31 and movably supported by a pivot 32. The arm 28, when pivotally moved, moves the cutter blade 6 toward or away from the axis of rotation of the rotary housing 3. A coiled spring 69 accommodated in a bore 68 formed at an intermediate portion of the pivotal arm 28 is fitted around the shank of a screw 34 fastening the cutter blade 6 to a support member 33 for biasing the cutter blade 6 into contact with the inner surface of the wheel mount 16 as seen in FIGS. 12 and 14. Recesses 70 and 71 opposed to each other are formed in the wheel mount 16 of the housing 3 and the free end 31 of the pivotal arm 28, respectively. The recess 70 in the wheel mount 16 is in communication with the mount bore 15. Spring support rods 72 and 73 are removably fitted in the recesses 70 and 71, respectively. Coiled springs 74, 74 are connected between the two rods 72, 73 at their opposed ends for biasing the free end 31 of the pivotal arm 28 toward the axis of rotation of the housing 3.

The interchangeable wheel 5 comprises a disklike main body 76, a support tube 77 extending from one side of the main body 76 centrally thereof, and a positioning pin 78 projecting from the main body 76 eccentrically thereof at a position away from the tube 77. An insertion bore 79 of a suitable diameter extends through the main body 76 and the support tube 77. The support tube 77 is formed in the outer periphery of an intermediate portion thereof with an engaging recess 80 in which the spring support rod 72 projecting into the mount bore 15 removably fits by being biased by the springs. Projecting from the inserted end of the support tube 77 is a biting amount adjusting portion 81 having a suitable thickness t. To avoid interference with the spring support rod 72, the bottom of the adjusting portion 81 is cut away. On the other hand, the rotary housing 3 has a bore 82 for the positioning pin 78 to fit in. The pivotal arm 28 has a pivotally moving portion 83 downwardly extending from each free end bifurcated portion 31 beyond the cutter blade 6. With reference to FIG. 14, the interchangeable wheel 5 is mounted in place by inserting the biting amount adjusting portion 81 of the support tube 77 into the mount bore 15 of the housing 3 while fitting the positioning pin 78 into the bore 82. During this procedure, the adjusting portion 81 first contacts the moving portions 83 of the pivotal arm 28 as indicated in phantom lines. As the wheel 5 is further inserted, the adjusting portion 81 and the pivotally moving portions 83 move relative to each other, thereby pivotally moving the arm 28 to raise the arm free end 31 against the force of the coiled springs 74 and move the cutter blade 6 away from the axis of rotation of the housing 3, whereby the biting amount is automatically adjusted. While the contact part of the moving portion 83 is rounded as illustrated to assure smooth sliding movement of the adjusting portion 81 and the moving portion 83 relative to each other, the adjusting portion 81 may alternatively be rounded. The thickness t of the biting amount adjusting portion 81 is so determined that the pivotal arm 28 will be pivotally moved in accordance with the wall thickness of the insulation covering 54 of a wire 53 diametrically corresponding to the insertion bore 79. Further as seen in FIG. 12, the spring support rod 72 engages in the recess 80 of the support tube 77, whereby the interchangeable wheel 5 is completely mounted in position.

What is claimed is:

1. An electric stripper comprising a rotatably supported rotary housing, electric drive means for rotating the rotary housing, an interchangeable wheel removably mountable on the rotary housing in the direction of the axis of rotation of the housing and having an electric wire insertion bore positionable in alignment with the axis, and a cutter blade mounted on the rotary housing and adjustable in biting amount for cutting off an insulation covering portion from an electric wire inserted through the insertion bore so that the insulation covering portion is cut off from the electric wire with the stripped conductor portion twisted by the rotation of the housing relative to the wire, the stripper being characterized in that said cutter blade is mounted on one free end of a pivotal arm pivotally movably supported by said rotary housing, said cutter blade being radially movable toward or away from said axis of rotation by the pivotal movement of said pivotal arm, said pivotal arm being biased radially either toward or away from said axis of rotation by spring means, said interchangeable wheel having a cutter blade biting amount adjusting portion slidingly engagable with a pivotal end portion of said pivotal arm to immobilize said pivotal end portion against the biasing of said spring means when said wheel is mounted on said rotary housing for determining the biting amount of said blade.

2. An electric stripper as defined in claim 1 wherein a second spring means biases the other free end of said pivotal arm away from said axis of rotation, said moving portion on said pivotal arm pivotally moves said cutter blade biting amount adjusting portion of said wheel in engagement therewith when said wheel is mounted on said rotary housing to move said pivotal arm toward said axis of rotation against the biasing of said second spring means.

3. An electric stripper as defined in claim 2 wherein said biting amount adjusting portion has an adjusting bore formed eccentrically of said wheel at a position away from said insertion bore, and said pivotal end portion comprises a rod projecting from said one free end of said pivotal arm.

4. An electric stripper as defined in claim 3 wherein the end of said projecting end of said moving rod has a gradually decreasing diameter toward its extremity and is tapered, and said adjusting bore is internally threaded, a fine adjustment screw being axially movably screwed in said threaded adjusting bore and having a tapered bore conforming to the shape of said tapered projecting end of said moving rod.

5. An electric stripper as defined in claim 1 wherein said spring means biases said one free end of said pivotal arm toward said axis of rotation, and the pivotally moving portion of said pivotal arm slidingly moves relative to said biting amount adjusting portion of said wheel in engagement therewith when said wheel is mounted on said rotary housing and moves the pivotal arm away from said axis against the of said spring means.

6. An electric stripper as defined in claim 3 further comprising cutting length adjusting means for restricting the length of electric wire to be inserted through said insertion bore of said wheel.

7. An electric stripper as defined in claim 4 further comprising cutting length adjusting means for restricting the length of electric wire to be inserted through said insertion bore of said wheel.

8. An electric stripper as defined in claim 5 further comprising cutting length adjusting means for restricting the length of electric wire to be inserted through said insertion bore of said wheel.

* * * * *